(12) United States Patent
Hirose (10) Patent No.: US 6,352,282 B2
(45) Date of Patent: *Mar. 5, 2002

(54) SEAT BELT MOUNTED AIRBAG APPARATUS

(76) Inventor: Tokuzo Hirose, 13-13, Higashiyama-cho, Ashiya-shi, Hyogo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/431,182

(22) Filed: Nov. 1, 1999

(51) Int. Cl.$^7$ .............................................. B60R 21/18
(52) U.S. Cl. ...................................................... 280/733
(58) Field of Search .............................. 280/733, 730.1, 280/728.2, 728.3, 735

(56) References Cited

U.S. PATENT DOCUMENTS

| | | | | |
|---|---|---|---|---|
| 3,933,370 A | * | 1/1976 | Abe et al. ................... | 280/733 |
| 4,348,037 A | * | 9/1982 | Law et al. ................... | 280/733 |
| 5,062,662 A | * | 11/1991 | Cameron ..................... | 280/733 |
| 5,184,844 A | * | 2/1993 | Goor .......................... | 280/733 |
| 5,242,193 A | * | 9/1993 | Humpal ....................... | 280/733 |
| 5,385,368 A | * | 1/1995 | Bridge ........................ | 280/733 |
| 5,642,902 A | * | 7/1997 | France ........................ | 280/733 |
| 5,794,971 A | * | 8/1998 | Boydston et al. ........... | 280/733 |

\* cited by examiner

*Primary Examiner*—Peter C. English
(74) *Attorney, Agent, or Firm*—Volentine Francos, PLLC (57) ABSTRACT

An airbag apparatus for vehicles, provided to protect a vehicle occupant by instantaneously inflating an airbag at the time of an accident such as a collision of a vehicle or automobile, and which is capable of securely holding and protecting the occupant and reducing injury to the occupant. The airbag apparatus includes an airbag which is inflated by being filled with gas, an airbag inflator for jetting gas and filling the airbag with the gas, and an acceleration sensor for detecting acceleration, the airbag apparatus being installed on the seat belt worn by the occupant. Since the direction of the gas jetted by the airbag inflator when the airbag is inflated is nearly parallel to an imaginary plane including a surface of a seat belt, the airbag apparatus does not strongly press the occupant, but securely holds the occupant whereby injury to the occupant can be minimized.

18 Claims, 12 Drawing Sheets

SEAT BELT MOUNTED AIRBAG APPARATUS

BACKGROUND OF THE INVENTION

1. Field of the Invention

The present invention relates to an airbag apparatus for vehicles which is provided to protect a vehicle occupant by instantaneously inflating an airbag at the time of an accident such as a collision of vehicles or automobiles. More particularly, it relates to an airbag apparatus for vehicles, wherein an airbag is installed on a so-called seat belt to be used by the occupant sitting in a seat of the vehicle.

2. Description of the Related Art

In a conventional airbag apparatus for vehicles, such as automobiles, an airbag is inflated instantaneously between the driver and the steering wheel, or between an occupant in the front passenger seat and the instrument panel at the time of an automobile collision to minimize injury to the occupant. This kind of conventional airbag apparatus for vehicles is generally used as an auxiliary apparatus that is supposed to be used together with the seat belt. In addition, the conventional airbag apparatus for vehicles is hardly provided in order to protect an occupant in the rear seat because of the lack of suitable space in the vehicles.

Furthermore, in the conventional airbag apparatus, the airbag for the driver is provided in a vicinity of the steering wheel, and the airbag for the occupant in the front passenger seat is provided in the vicinity of the glove box and the dashboard. If the relative position between the occupant and the vehicle becomes misaligned at the time of a vehicle collision, the inflated airbag cannot securely hold the occupant. Moreover, in the case of the conventional airbag apparatus for vehicles, there is no place for providing the airbag apparatus for protecting the occupant in the rear seat. Therefore, the occupant in the rear seat cannot be protected sufficiently.

Besides, electric trains, trains, airplanes, ships and the like are not provided with an airbag apparatus yet.

SUMMARY OF THE INVENTION

Hence, the present invention is intended to provide an airbag apparatus for protecting a vehicle occupant by instantaneously inflating an airbag at the time of an accident such as a collision of vehicles, which airbag apparatus is capable of securely holding and protecting the body of the occupant and reducing injury to the occupant.

The present invention provides an airbag apparatus for vehicles for protecting a vehicle occupant by instantaneously inflating an airbag at the time of an accident, the airbag apparatus comprising:

an airbag inflated by being filled with gas,
    the airbag being installed on a seat belt worn by an occupant;
airbag inflating means for jetting gas and filling the airbag therewith; and
an acceleration sensor for detecting acceleration,
wherein the airbag is inflated forward and/or sideward of the occupant sitting in a seat.

In accordance with the invention, since the airbag apparatus provided with the airbag capable of instantaneously inflating at the time of an accident such as a vehicle collision to protect the vehicle occupant is installed on a seat belt, the air bag instantaneously inflates at the time of a vehicle accident to securely hold and protect the body of the occupant and minimize injury to the occupant. The airbag apparatus includes the acceleration sensor which detects high acceleration at the time of a vehicle accident such as a vehicle collision, and the airbag apparatus can inflate the airbag. Since the airbag apparatus is installed on the seat belt, impact applied to the occupant by the inflated airbag can be reduced, and the time from the occurrence of a vehicle accident such as a vehicle collision, to the inflation of the airbag can be extended, whereby the operation reliability of the airbag apparatus can be improved. Since the airbag inflates forward of the occupant sitting in a seat, the occupant does not directly make contact with the steering wheel, windshield or front seat disposed forward of the occupant held in the seat at the time of an accident. Therefore, impact applied to the occupant at the time of a vehicle accident or the like can be reduced, and injury to the occupant can thus be reduced.

Furthermore, the present invention provides an airbag apparatus for vehicles, for protecting a vehicle occupant by instantaneously inflating an airbag at the time of an accident, the airbag apparatus comprising:

an airbag inflated by being filled with gas,
    the airbag being installed on a seat belt worn by an occupant;
airbag inflating means for jetting gas and filling the airbag therewith; and
an acceleration sensor for detecting acceleration,
wherein the airbag is inflated forward of the occupant sitting in a seat, and a direction of the gas jetted from the airbag inflating means is not perpendicular to an imaginary surface including a surface of the seat belt.

In accordance with the invention, the airbag apparatus provided with the airbag capable of instantaneously inflating at the time of an accident such as a vehicle collision to protect the vehicle occupant is installed on the seat belt, and at the time of a vehicle accident the air bag instantaneously inflates to securely hold and protect the body of the occupant, with the result that injury to the occupant can be minimized. Since the airbag apparatus includes the acceleration sensor, the acceleration sensor detects high acceleration at the time of a vehicle accident such as a vehicle collision, and the airbag apparatus can inflate the airbag. Since the airbag apparatus is installed on the seat belt, impact applied to the occupant by the inflating airbag can be reduced, and the time from the occurrence of a vehicle accident such as a vehicle collision, to the inflation of the airbag can be extended, whereby the operation reliability of the airbag apparatus can be improved. Since the airbag inflates forward of the occupant sitting in a seat, and the direction of the gas jetted from the airbag inflating means is not perpendicular to the imaginary surface including the surface of the seat belt, the occupant does not directly make contact with the steering wheel, windshield or front seat disposed forward of the occupant held in the seat at the time of an accident, and a force applied to the occupant at the time of the inflation of the airbag can be decreased. Therefore, impact applied to the occupant at the time of a vehicle accident or the like can be reduced, and injury to the occupant can thus be reduced.

Furthermore, the present invention provides an airbag apparatus for vehicles, for protecting a vehicle occupant by instantaneously inflating an airbag at the time of an accident, the airbag apparatus being installed on a seat belt worn by the occupant, comprising:

one or more inflatable airbags which inflate forward and/or sideward of the occupant sitting in a seat;
airbag inflating means for inflating the airbag(s) when high acceleration occurs at the time of an accident; and one or more acceleration sensors for detecting acceleration which occurs at the time of an accident, wherein the airbag inflating means includes a gas generator for jetting gas into the airbag(s) and a processing circuit for processing signals from the one or more acceleration sensors and activating the gas generator when the acceleration arrives at a predetermined value or more, and the airbag is made of synthetic fiber and is formed so as to be accommodated in a folded condition in an airbag storage member made of a synthetic resin, before inflating, and to be instantaneously inflated by being filled with gas jetted by the gas generator.

In accordance with the invention, since the airbag apparatus provided with the one or more airbags capable of inflating forward and/or sideward of the occupant sitting in a seat is installed on the seat belt worn by the occupant, the one or more airbags are inflated forward and/or sideward of the occupant. Since the airbag apparatus is provided with the acceleration sensor(s) for detecting high acceleration occurring at the time of an accident such as a vehicle collision and the airbag inflating means for inflating the airbag(s), the airbag apparatus can protect the occupant at the time of an accident such as a vehicle collision. Since the airbag apparatus is provided with the one or more acceleration sensors for detecting acceleration occurring at the time of an accident such as a vehicle collision, and the airbag inflating means is also provided with the processing circuit for processing signals from the one or more acceleration sensors and activating the gas generator for jetting gas and filling the gas into the airbag(s) at the time when acceleration arrives at the predetermined value or more, it is possible to protect the occupant against impact which occurs at the time of a vehicle accident. Since the airbag, made of synthetic fiber, is accommodated in the airbag storage member made of a synthetic resin in a folded condition before inflating, and can be instantaneously inflated when the gas generator is activated, impact applied to the occupant at the time of a vehicle accident or the like can be reduced, and injury to the occupant can thus be reduced.

Furthermore, in the invention it is preferable that the airbag apparatus is installed on the seat belt so that a position of the airbag apparatus can be adjusted in a longitudinal direction of the seat belt.

In accordance with the present invention, since the airbag apparatus is installed so that the position of the airbag apparatus can be adjusted in the longitudinal direction of the seat belt, the position of the airbag can be adjusted properly depending on the size and physique of the occupant, whereby impact applied to the occupant at the time of a vehicle accident or the like can be reduced, and injury to the occupant can thus be reduced.

Furthermore, in the invention it is preferable that the airbag apparatus is installed on a seat belt installed in a seat provided in automobiles, airplanes, buses, ships, trains and human-ridden amusement park facilities.

In accordance with the invention, the airbag apparatus is installed on the seat belt provided on a seat inside automobiles, airplanes, buses, ships, trains and human-ridden amusement park facilities. Therefore, at the time of an accident in such automobiles, airplanes, buses, ships, trains and human-ridden amusement park facilities, impact applied to the occupant can be reduced, and injury to the occupant can thus be reduced.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

With refernce to FIGS. 1–7, a vehicle 2 is a generally used automobile driven by a driver 3 and comprises a vehicle body 4 and wheels 5 driven by a drive apparatus (not shown) installed inside the vehicle body 4.

Figure 1:
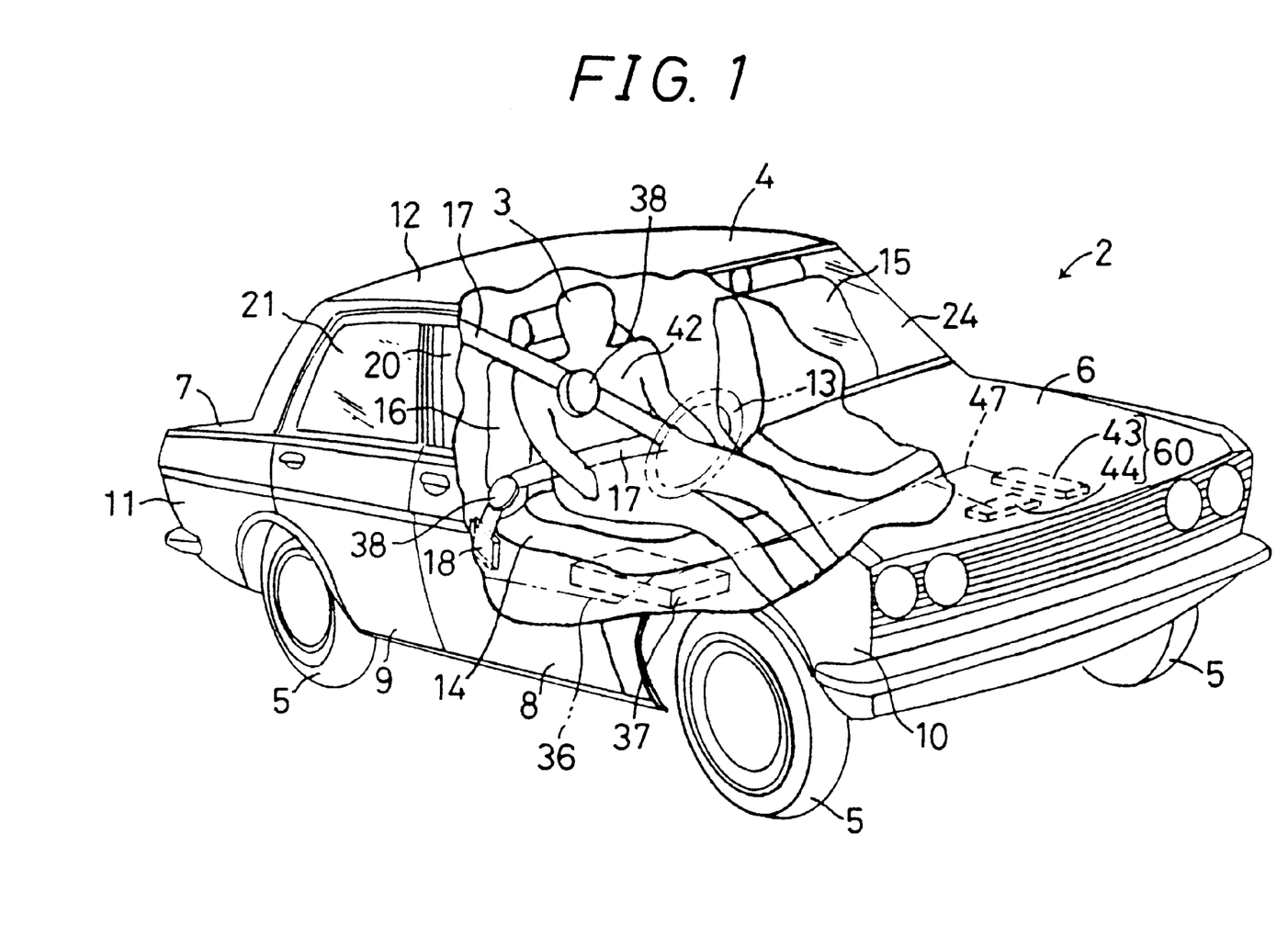
FIG. 1 is a schematic perspective view showing a vehicle 2 provided with an airbag apparatus 1 of an embodiment of the present invention.

The vehicle body 4 comprises a hood 6, a trunk lid 7, front doors 8, rear doors 9, front fenders 10, rear fenders 11 and a roof 12, each being made of one or two kinds of materials appropriately selected from among metallic materials, synthetic resin materials, fiberglass reinforced plastic materials, carbon fiber reinforced plastic materials, etc. The inside portions of the trunk lid 7, the front doors 8, the rear doors 9 and the roof 12, that is, the inside portions of the vehicle, are covered with synthetic resin materials, cloth materials and leather materials to provide comfortable feelings to occupants. In the descriptions of the present embodiment, an "occupant" generically refers to the driver 3 who drives the vehicle 2 or a person sitting in the front passenger seat or the rear seat (sometimes referred to as a passenger), or a person sitting in a vehicle seat.

The drive apparatus for transmitting drive power to the wheels 5 is installed under the front portion of the vehicle body 4, i.e., the hood 6 or under the rear portion of the vehicle body 4, i.e., the trunk lid 7. The wheels 5 are controlled by a steering wheel 13 operated by the driver 3 so that the rotation direction thereof can be adjusted.

The interior of the vehicle body 4 is provided with a driver's seat 14 in which the driver 3 sits and a front passenger seat 15 and a rear seat (not shown) in which occupants sit. In the present specification, the driver's seat 14, the front passenger seat 15 and the rear seat are sometimes generically referred to as a "seat."

The driver's seat 14, the front passenger seat 15 and the rear seat are made of cushion materials such as urethane pads or the like and covered with cloth materials and leather materials to provide comfortable feelings to the occupants. Each of the seats can be subjected to displacement adjustment along the traveling direction of the vehicle 2 by using a slide mechanism, and the backrest 16 of the seat can be tilted by a reclining mechanism to an angle suited for the preference of the occupant.

The vehicle body 4 is provided with seat belts 17 used to hold occupants in the driver's seat 14, front passenger seat 15 and rear seat. The seat belts 17 are made of synthetic fiber. However, they may be made of synthetic resin materials, cloth materials or leather materials in consideration of strength, wearing feelings and the like. The seat belts 17 are flat, belt-like, flexible and supple.

First ends of the seat belts 17 are secured to the driver's seat 14, the front passenger seat 15 and the rear seat, respectively, or secured to securing members 18 (see FIG. 9) of the driver's seat 14, the front passenger seat 15 and the rear seat, respectively. The other ends thereof are connected to seat belt retractors 19 (see FIG. 9) capable of delivering, taking up and securing the seat belts 17 as necessary. The seat belt retractors 19 for the seat belts 17 of the driver's seat and the front passenger seat are installed in portions held between a front door window 20 and a rear door window 21 or in the vicinity thereof. The seat belt retractor 19 for the seat belt 17 of the rear seat is installed in the inside or surface of the rear seat. Located midway between the one end and the other end of the seat belt 17, a seat belt tongue plate 23, provided with a fitting portion 22 (see FIG. 9) to be fitted into a buckle (not shown) installed in the side portion of the driver's seat 14 or the front passenger seat 15, or on the rear seat, is provided so that the seat belt 17 passes therethrough. By fitting the fitting portion 22 of the seat belt tongue plate 23 into the buckle, the occupant is held in the driver's seat 14, the front passenger seat 15 or the rear seat. Since the occupant is held in the driver's seat 14, the front passenger seat 15 or the rear seat, it is possible to prevent the occupant from violently colliding with the steering wheel 13 and/or the windshield 24 or jumping out of the vehicle 2 at the time of an accident such as a collision of the vehicle 2.

Figure 2:
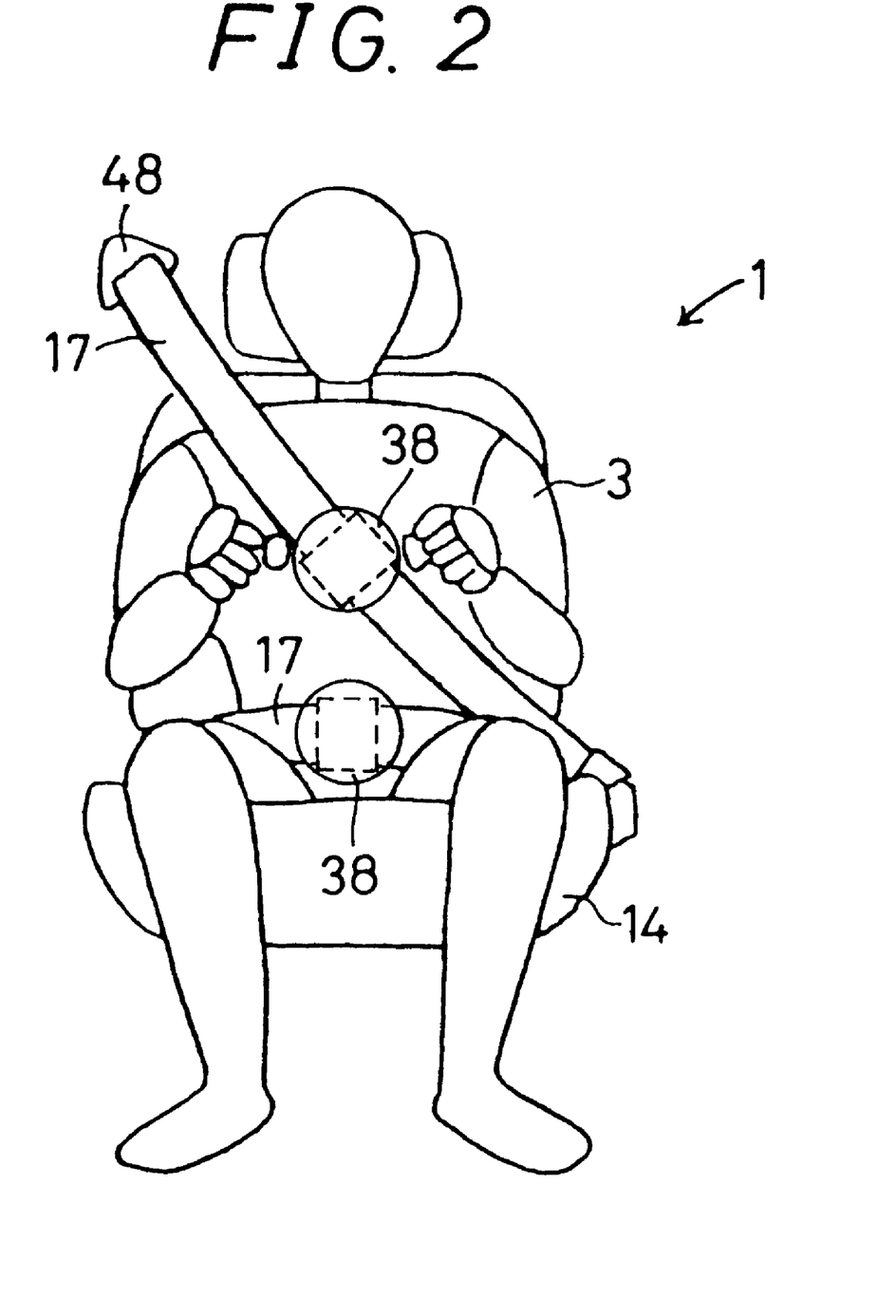
FIG. 2 is a schematic front view showing a condition wherein an occupant wears an automobile seat belt provided with the airbag apparatus 1.

The seat belt 17 is a 3-point seat belt capable of securing the lower body and upper body of the occupant at the waist of the occupant and from the shoulder to the waist through the chest of the occupant in a diagonally wearing condition. The seat belt 17 worn by the occupant in the rear seat may be a 2-point seat belt capable of securing the portions around the waist of the occupant. In addition, the seat belt 17 may be the so-called racer-type, 4-point seat belt capable of securing the ranges from the right and left shoulders to the portions around the waist of the occupant. In the case of the driver's seat 14 of a right-hand drive car, for example, one end of the seat belt 17 is secured to the securing member 18 installed on the right side of the driver's seat 14, and the other end of the seat belt 17 is secured by the seat belt retractor 19 installed in the inside of the vehicle body 4 in a right rearward position of the driver's seat 14. The point located midway between the one end and the other end of the seat belt 17 is secured by the buckle and the fitting portion 22 of the seat belt tongue plate 23.

The seat belt retractor 19 may be any type selected from among the NLR (non-locking retractor) type, the ALR (automatic locking retractor) type and the ELR (emergency locking retractor) type. However, the ELR type capable of sensing impact due to a collision or the like, securing the seat belt 17 in an emergency such as a collision and securely holding the occupant is preferable. Furthermore, in the case when the seat belt retractor 19 is the ELR type, it is classified into a vehicle-body sensitive type that secures the seat belt 17 when high acceleration of the vehicle 2 is detected, a webbing sensitive type that secures the seat belt 17 when the seat belt 17 is delivered abruptly, and a multiplex sensitive type having the functions of both the vehicle-body sensitive type and the webbing sensitive type.

The seat belt 17 is provided with an airbag apparatus 1 having an airbag(s) 30 that can inflate when strong impact is received due to a collision or the like of the vehicle 2. With the airbag apparatus 1, the airbag (s) 30 is inflated between the vehicle body 4 and the occupant such as the driver 3 at the time of an accident such as a collision of the vehicle 2, thereby being capable of preventing the occupant from being injured by direct contact with the vehicle body 4.

The airbag apparatus 1 is installed on the seat belt 17 worn by the occupant such as the driver 3. It comprises one, two or more inflatable airbags 30 that inflate forward and/or sideward of the occupant when the occupant sits in a seat such as the driver's seat 14, the front passenger seat 15 or the rear seat, an airbag inflator 31 for inflating the airbag(s) 30 at the time of an accident such as a collision of the vehicle 2, and acceleration sensors 43 and 44 for detecting acceleration occurring at the time of an accident such as a vehicle collision.

Figure 3:
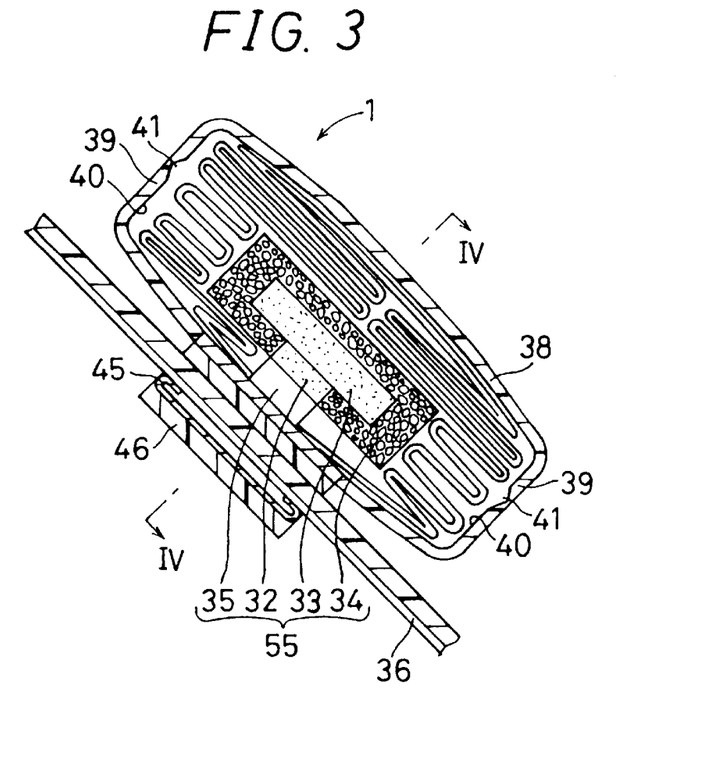
FIG. 3 is a schematic sectional view showing an airbag 30 of the airbag apparatus 1 accommodated in an airbag storage member 38.

The airbag 30 is inflated by the airbag inflator 31. The airbag inflator 31 comprises a processing circuit 37 that processes signals from the acceleration sensors 43 and 44 and activates a gas generator 55 at the time when acceleration is a predetermined value or more, and the gas generator 55 for jetting gas into the airbag 30.

The gas generator 55 comprises an ignition agent 32, an inflammation agent 33, a gas generation agent 34 and an ignition apparatus 35. The gas generator 55 is activated by an electric signal transmitted from the processing circuit 37 installed under the driver's seat 14, the front passenger seat 15 or the rear seat via conductive wires 36 provided along the surface of the seat belt 17 or through the inside of the seat belt 17. As a result, the airbag 30 is instantaneously filled with gas, and thus inflated. The gas used to inflate the airbag 30 is a gas which is generated from a gas generation agent 34 mainly containing sodium nitride etc. and contains air as described later.

The ignition apparatus 35 of the gas generator 55 is activated by the electric signal transmitted from the processing circuit 37, and the ignition agent 32 is ignited by an ignition member (not shown) The gas generation agent 34 is reacted by the inflammation a gent 33 for effectively reacting the ignited and heated ignition agent 32 with the gas generation agent 34. As a result, gas is generated to inflate the airbag 30.

The ignition agent 32 is gunpowder, such as boron potassium sulfate, and instantaneously generates heat and flames by using the ignition member. The gas generation agent 34 includes sodium nitride etc., and is burnt by heat and flames caused by the ignition agent 32 and the inflammation agent 33, thereby to instantaneously generate a large amount of nitrogen gas. The large amount of gas generated instantaneously inflates the airbag 30, and the inflated airbag 30 can minimize injury to the occupant at the time of the collision. The inflated airbag 30 can protect the head, face, chest, etc. of the occupant by covering them.

Figure 6:
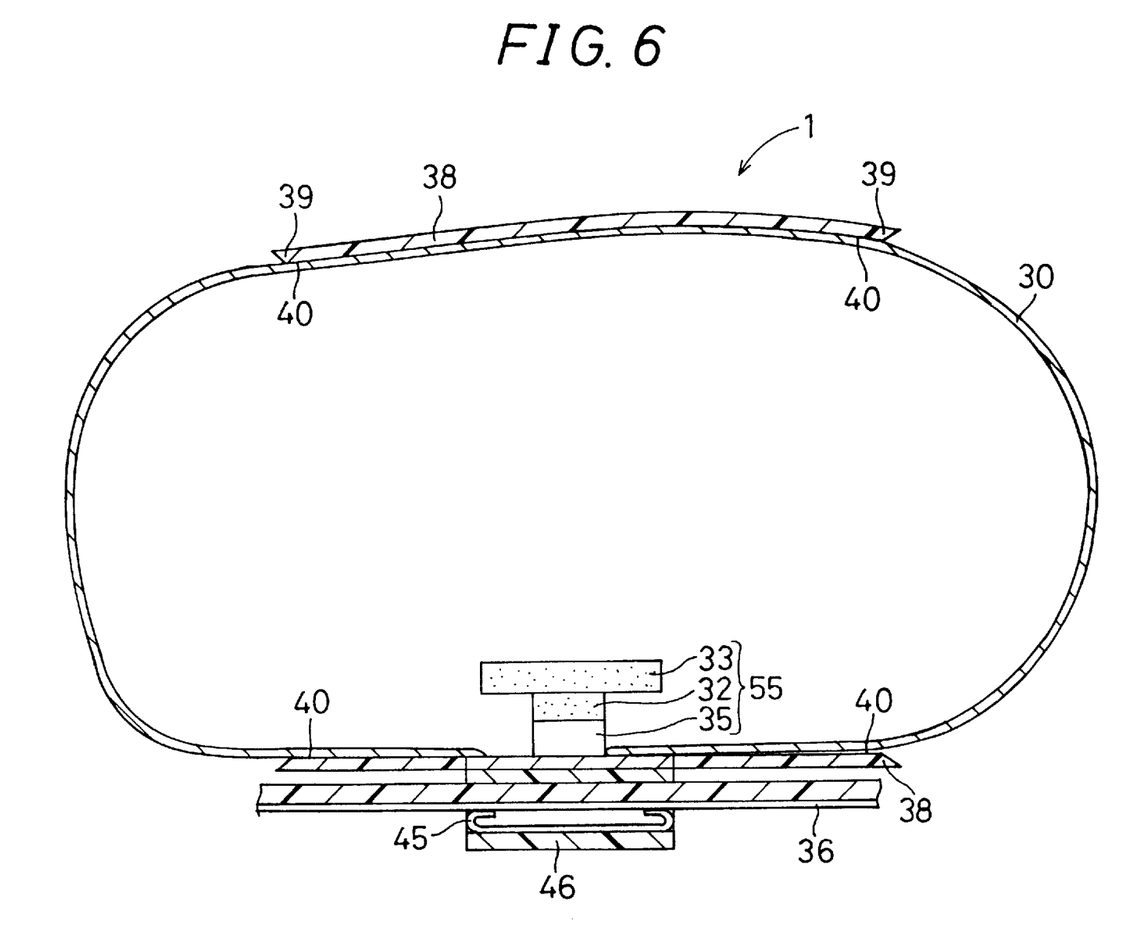
FIG. 6 is a schematic sectional view showing a condition wherein the airbag 30 has been inflated.

Part of the gas filling the airbag 30 is discharged from a gas discharge port provided in the airbag 30 immediately after the inflation of the airbag 30, and the airbag 30 shrinks abruptly. If the gas is not discharged from the airbag 30 after the inflation of the airbag 30, and the airbag 30 remains inflated, impact applied to the occupant cannot be absorbed because of the repulsion force of the inflated airbag 30, whereby the occupant cannot be protected sufficiently. To sufficiently protect the occupant, the gas is discharged from the airbag 30 after the inflation. Furthermore, when the occupant is required to drive the vehicle 2 even after a collision of the vehicle 2, if the airbag 30 remains inflated, the occupant cannot drive the vehicle 2. In addition, the inflated airbag 30 prevents the occupant from moving. For these reasons, the gas is discharged from the airbag 30 after the inflation.

The airbag 30 is made of synthetic fiber such as nylon, and accommodated in an airbag storage member 38 made of a synthetic resin in a folded condition during ordinary traveling of the vehicle 2. When the gas generation apparatus 55 is activated, the interior of the airbag 30 is filled with gas so as to be inflated instantaneously. The airbag 30 may be made of a material being flexible and non-expandable. The portion of the inflated airbag 30, making contact with the occupant, is made of a material being softer than the occupant to prevent injury to the occupant. For example, the portion of the inflated airbag 30, making contact with the occupant, may be covered with a cushion material.

Figure 4:
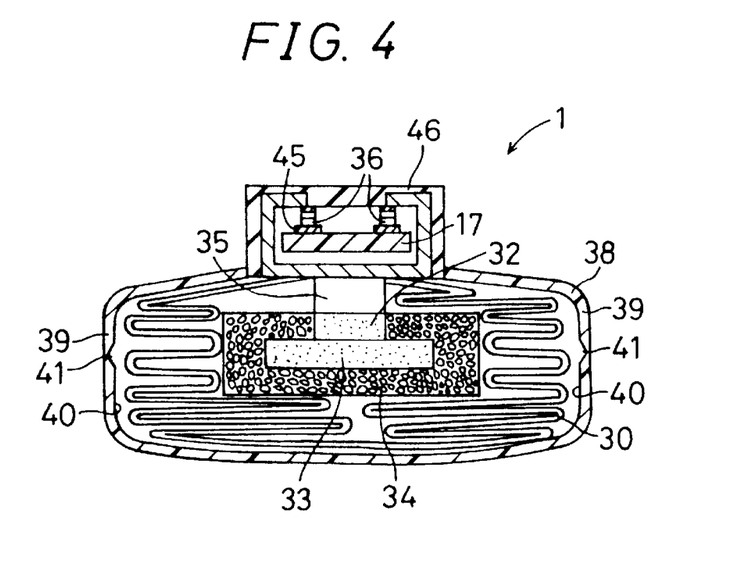
FIG. 4 is a sectional view of the airbag apparatus 1 in a vicinity of the airbag 30, taken on line IV—IV of FIG. 3.
Figure 5:
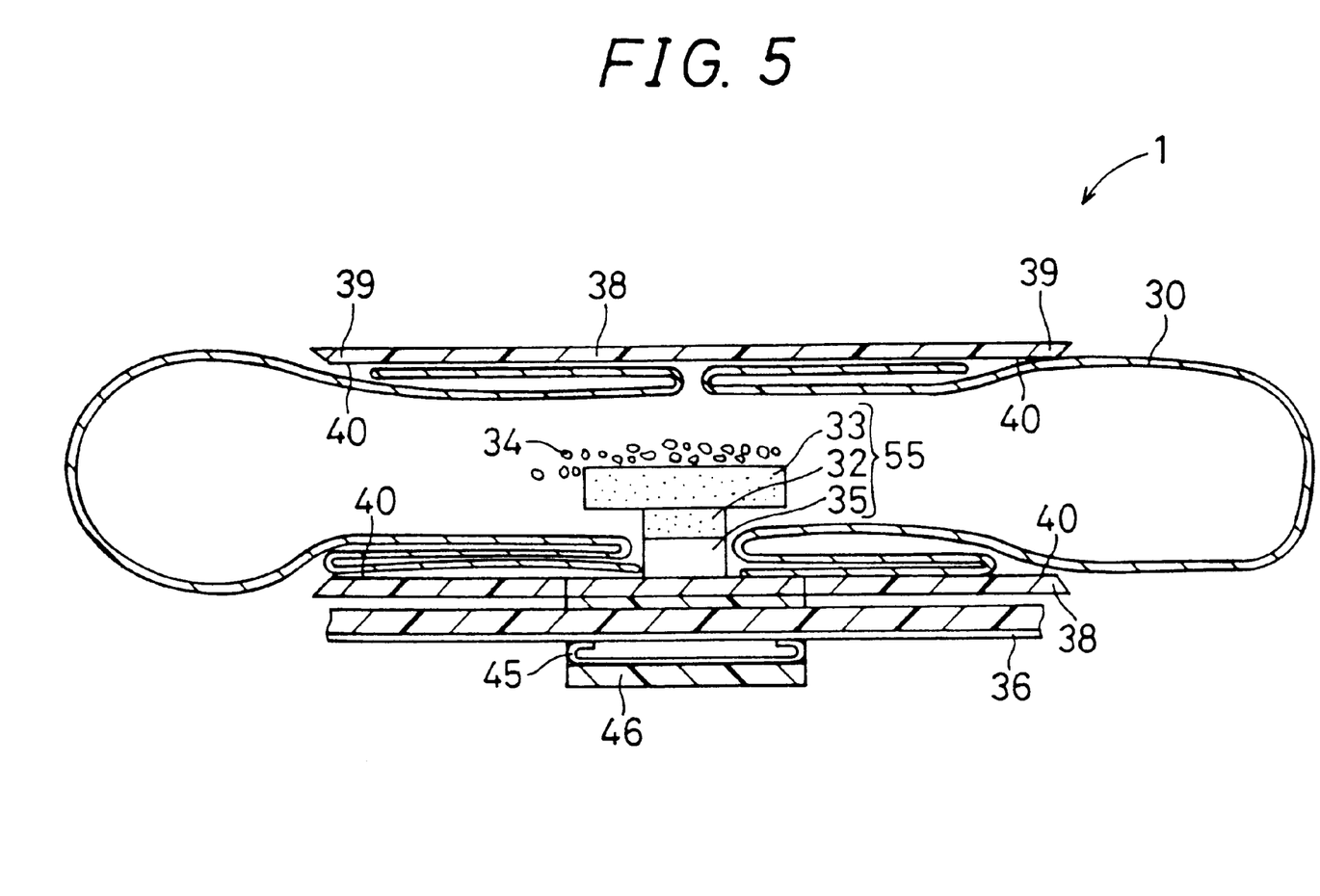
FIG. 5 is a schematic sectional view showing a condition wherein the airbag 30 is being inflated.

Plural notches 41 are formed on the inner surface 40 of a side wall 39 constituting the side portion of the airbag storage member 38 and facing sideward directions relative to an occupant 42. The air bag storage member 38 also includes a top wall (see FIG. 3) facing a forward direction relative to the occupant 42. When the airbag 30 is inflated by gas, the inner surface 40 of the side wall 39 is pressed by the airbag 30 being inflated, and the side wall 39 is torn and opened as the notches 41 are split, whereby the airbag 30 can be inflated easily. In other words, the direction of the gas jetted by the gas generator 55 of the airbag inflator 31 becomes nearly parallel to an imaginary plane including the surface of the seat belt 17. For this reason, when the airbag 30 is inflated, the occupant is not pressed strongly, and the sliding member 46 of the airbag apparatus 1 is not pressed against the body of the occupant 42. Therefore, the occupant 42 is not injured.

The airbag apparatus 1 having the airbag 30 is installed on the seat belt 17, and provided so as to inflate the airbag 30 forward and/or sideward of the occupant 42 with respect to the traveling direction of the vehicle. Therefore, the airbag 30 is inflated forward and/or sideward of the occupant 42, whereby the occupant can be held securely. Consequently, the occupant can be protected against impact caused owing to a collision in the traveling forward direction of the vehicle 2 and against impact caused owing to a collision in the sideward direction of the vehicle 2.

Furthermore, unlike the conventional airbag apparatus wherein the airbag 30 is accommodated in the steering wheel 13 or in the vicinity of the glove box and the dashboard, the airbag 30 of the airbag apparatus 1 of the present embodiment is installed on the seat belt 17. For this reason, the time between the collision to the activation of the airbag inflator 31 can be set longer, and the accuracy and setting ranges of the acceleration sensors 43 and 44, to be described later, can be extended, whereby the activation reliability of the airbag apparatus 1 can be improved. In the present embodiment, two acceleration sensors, the acceleration sensors 43 and 44, are used. The acceleration sensor 43 is a traveling direction acceleration sensor for sensing acceleration in the direction nearly parallel to the traveling direction of the vehicle 2, and the acceleration sensor 44 is a sideward acceleration sensor for sensing acceleration in the direction nearly perpendicular and nearly horizontal to the traveling direction of the vehicle 2. However, the acceleration sensors 43 and 44 indicated collectively as 60 in FIGS. 1 and 9, may be combined so as to detect acceleration in other directions.

Moreover, in the event of a collision in the traveling forward direction of the vehicle 2, when the airbag 30 is accommodated in the steering wheel 13 or in the vicinity of the glove box and the dashboard just as in the case of the conventional airbag apparatus, the direction of the occupant moving in the traveling forward direction of the vehicle 2 owing to the collision is opposite to the inflation direction of the airbag 30. Therefore, the impact of the airbag 30 received by the occupant is determined by the addition of the moving speed of the occupant in the traveling forward direction of the vehicle 2 and the inflating speed of the airbag 30. However, in the case of the airbag apparatus 1 of the present embodiment, the direction of the occupant moving in the traveling forward direction of the vehicle 2 owing to the collision is nearly perpendicular to the inflation direction of the airbag 30. Therefore, the impact of the airbag 30 received by the occupant can be decreased. Consequently, when the occupant makes contact with the inflated airbag 30, it is possible to prevent the occupant from being injured by the airbag 30.

Figure 7:
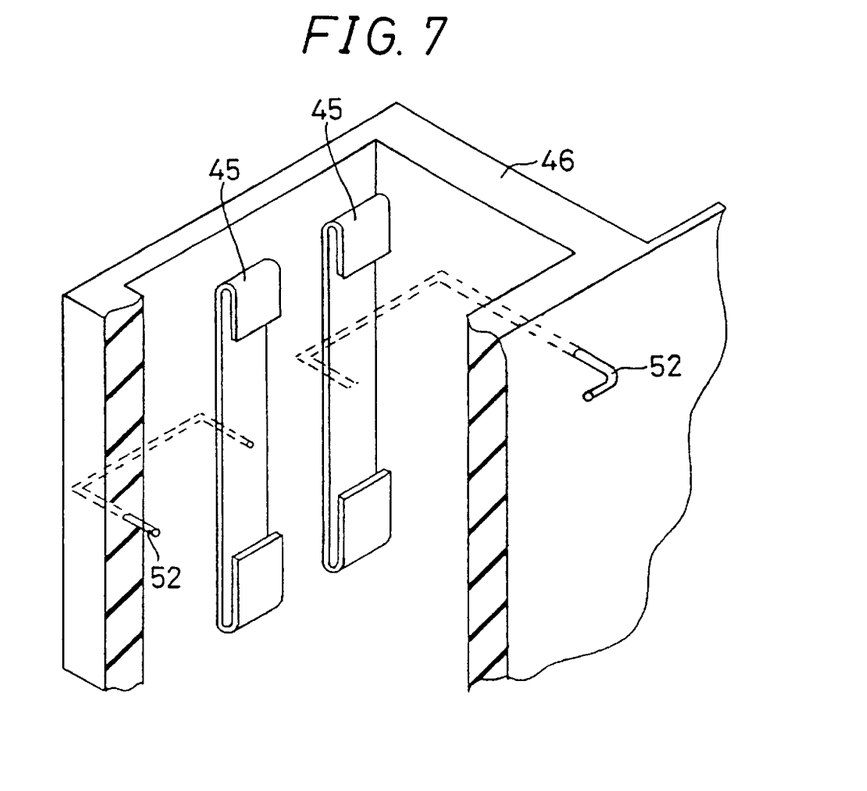
FIG. 7 is a schematic sectional perspective view showing the sliding member 46 of the airbag apparatus 1.

The airbag 30 is installed on the seat belt 17 so that the position of the airbag 30 can be adjusted in the longitudinal direction of the seat belt 17 via the airbag storage member 38 in which the airbag 30 is accommodated. In other words, the sliding member 46 having metallic spring members 45 therein, through which the seat belt 17 passes, is provided at the lower portion of the airbag storage member 38. The spring members 45 press the seat belt 17 by using the spring forces of the spring members 45, whereby the airbag storage member 38 can be secured at a desired position along the seat belt 17. By applying a force against the spring forces of the spring members 45, the position of the airbag storage member 38 can be changed in the longitudinal direction of the seat belt 17, whereby the position of the airbag storage member 38, that is, the position of the airbag 30, can be adjusted to a desired position. As a result, the position of the airbag 30 can be adjusted properly depending on the size and physique of the occupant, whereby it is possible to securely protect the occupant against impact owing to a collision or the like.

When the conductive wires 36 make contact with the spring members 45, the electric signal supplied from the processing circuit 37 is transmitted from the spring members 45 to the ignition apparatus 35 of the airbag inflator 31 via the conductive wires 52 to activate the ignition apparatus 35.

Figure 9:
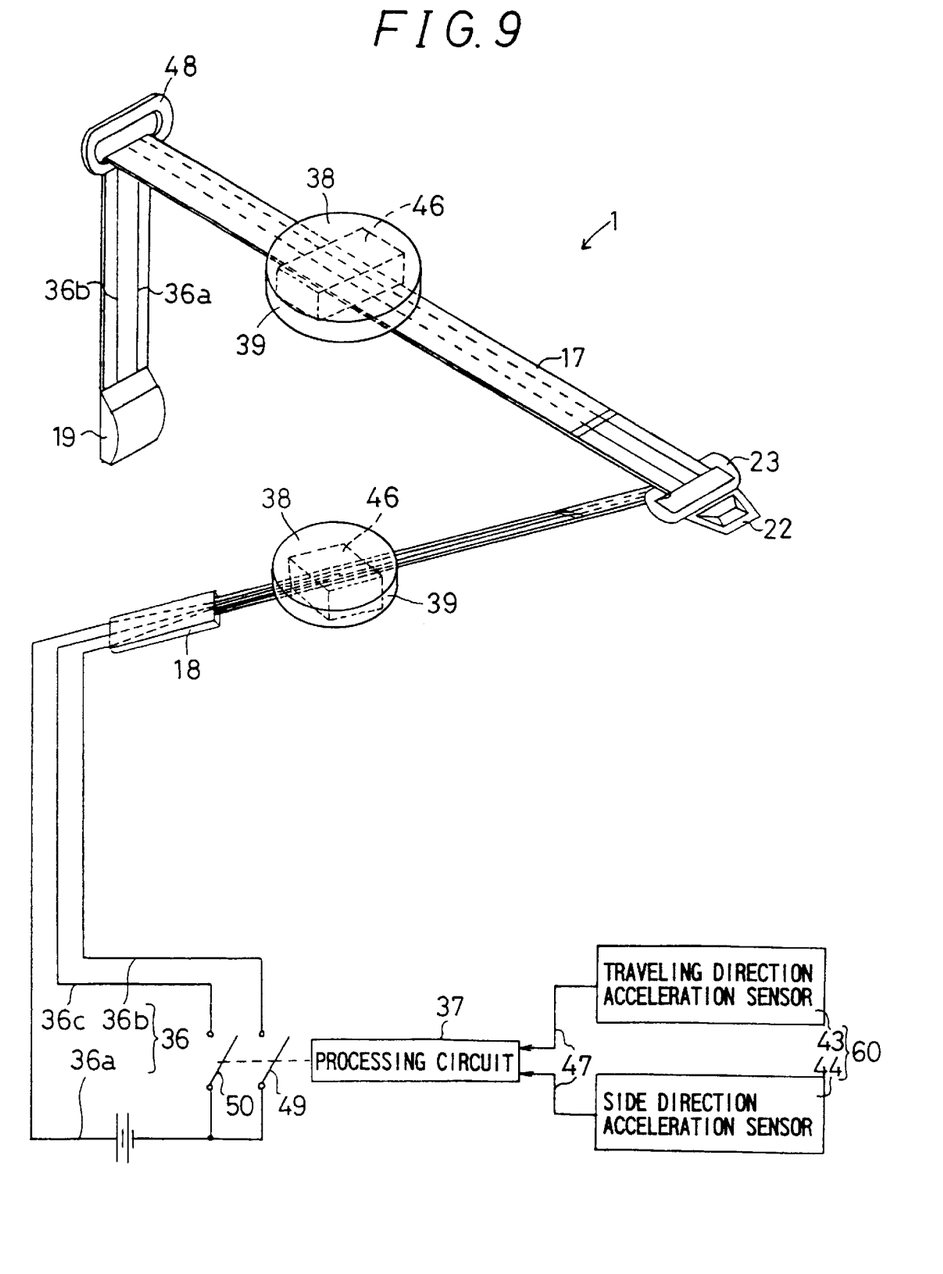
FIG. 9 is a schematic plan view showing a configuration wherein an electric signal is transmitted from a processing circuit 37 to an inflation 31.

Via conductive wires 47, the processing circuit 37 is electrically connected to the acceleration sensor 43 for sensing acceleration in the direction nearly parallel to the traveling direction of the vehicle 2 and also electrically connected to the acceleration sensor 44 for sensing acceleration in the direction nearly perpendicular and nearly horizontal to the traveling direction of the vehicle 2, the two sensors being installed under the hood 6.

The processing circuit 37 processes the electric signals from the acceleration sensors 43 and 44. When acceleration becomes a predetermined value or more, the processing circuit 37 activates the gas generator 55 of the airbag inflator 31 to jet gas into the airbag 30, thereby to inflate the airbag 30. In the present embodiment, one traveling direction acceleration sensor and one sideward acceleration sensor are provided as the acceleration sensors 43 and 44. However, in another embodiment of the airbag apparatus of the present invention, plural traveling direction acceleration sensors and plural sideward acceleration sensors may be provided. Furthermore, the installation positions of the traveling direction acceleration sensor and the sideward acceleration sensor are not limited, provided that the airbag can be inflated securely and injury to the occupant can be minimized at the time of an accident such as a vehicle collision.

In the present embodiment, the processing circuit 37 for activating the airbag inflator 31 is assumed to process the electric signals from the acceleration sensors 43 and 44. However, in an airbag apparatus in accordance with another embodiment of the present invention, an airbag inflator means using a mechanical ignition apparatus may be used as an airbag inflator for inflating an airbag. Furthermore, an airbag inflator using an electric ignition apparatus impact sensor may also be used. A coil spring type, a roll spring type, a cylinder ball type or a semiconductor type may be used as the electric ignition apparatus impact sensor.

As described above and with reference to FIGS. 8–15, one end of the seat belt 17 is secured to the securing member 18, and the other end thereof is connected to the seat belt retractor 19. Located midway between the one end and the other end of the seat belt 17, the seat belt tongue plate 23 is provided so that the seat belt 17 passes therethrough. The seat belt 17 delivered from the seat belt retractor 19 is passed through a seat belt guide 48 installed on the vehicle 4, and the seat belt 17 is worn by the occupant from the shoulder to the waist through the chest of the occupant in a diagonally wearing condition.

Figure 11:
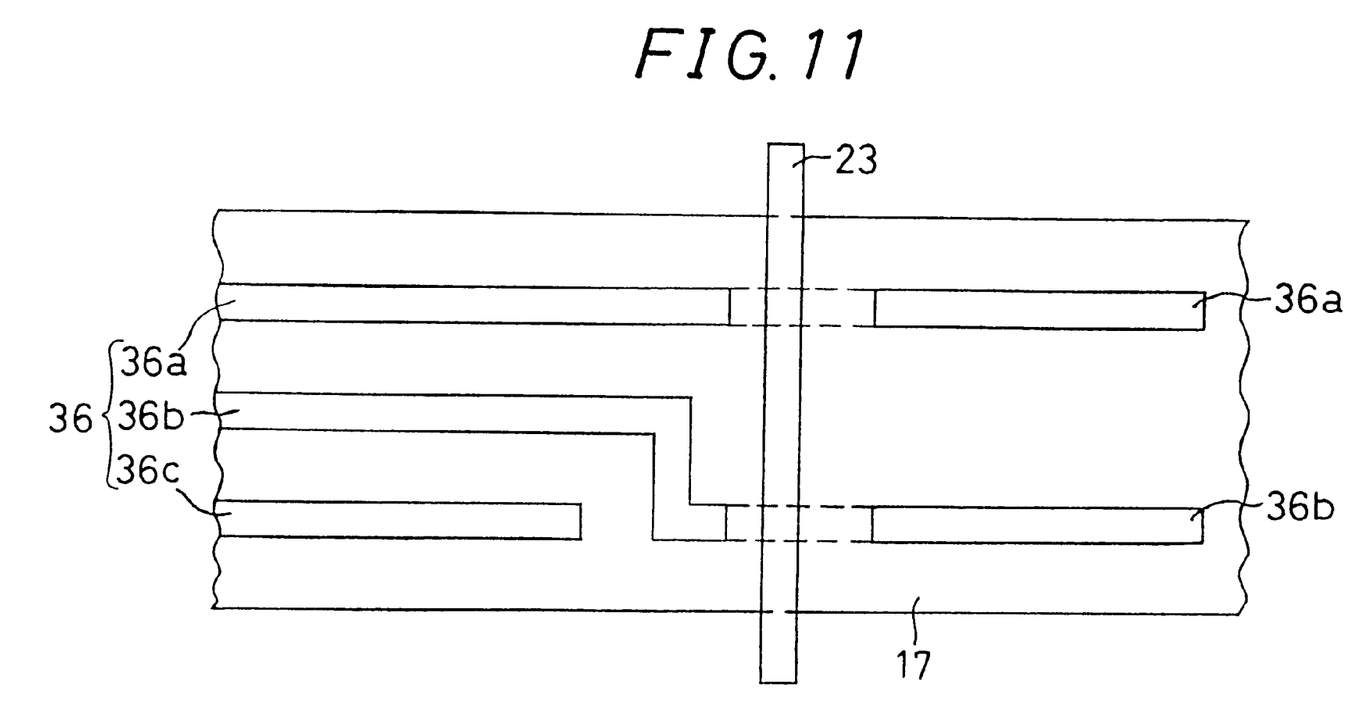
FIG. 11 is a schematic partial plan view showing the seat belt 17.

The portion of the sea t belt tongue plate 23, through which the seat belt 17 passes, and the seat belt guide 48 are made of metal, and formed in the shape of a ring having rigidity. In addition, the portion of the seat belt tongue plate 23 and the portion of the seat belt guide 48, through which the seat belt 17 passes, have a uniform outer diameter in the axial direction, and their cross-sectional shapes are made circular.

Figure 10:
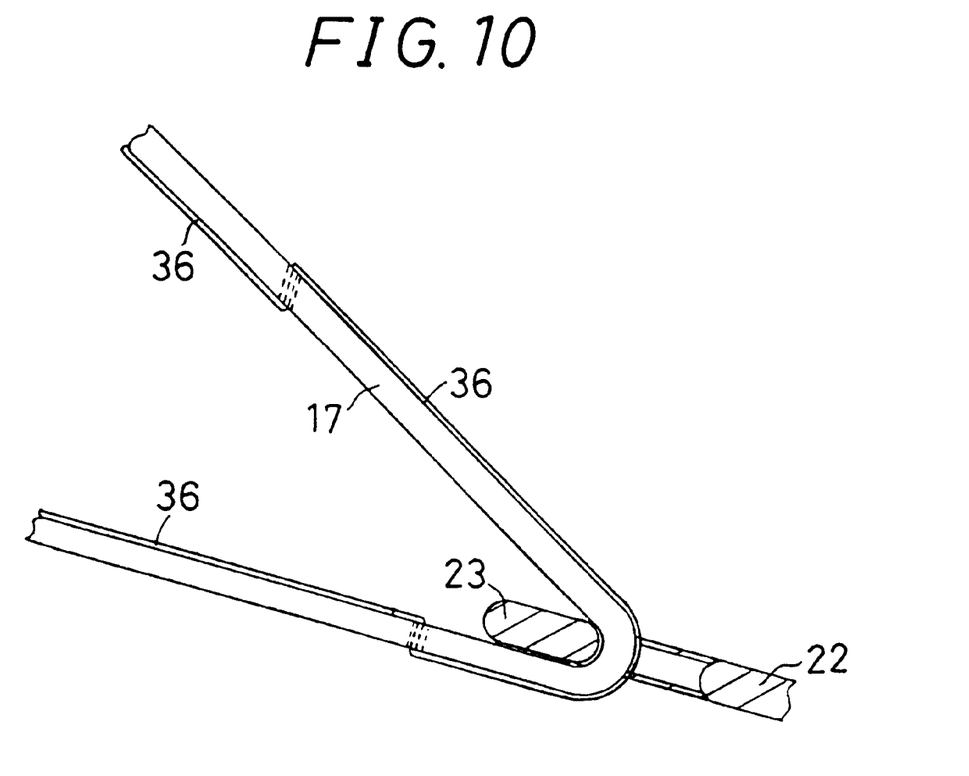
FIG. 10 is a partially sectional view of a seat belt 17, for illustrating a method of disposing conductive wires 36 provided along the seat belt 17.

The conductive wires 36 are provided along the surface and/or through the inside of the seat belt 17. In the range wherein the seat belt 17 makes contact with the seat belt guide 48 and in the range wherein the seat belt 17 makes contact with the seat belt tongue plate 23, the conductive wires 36 are provided in the inside of the seat belt 17 or on one side of the surface of the seat belt 17, not making contact with the seat belt guide 48 and/or the seat belt tongue plate 23. Therefore, the conductive wires 36 do not make contact with the seat belt guide 48 and/or the seat belt tongue plate 23. As a result, the conductive wires 36 are not damaged by the delivery and taking-up of the seat belt 17.

Figure 8:
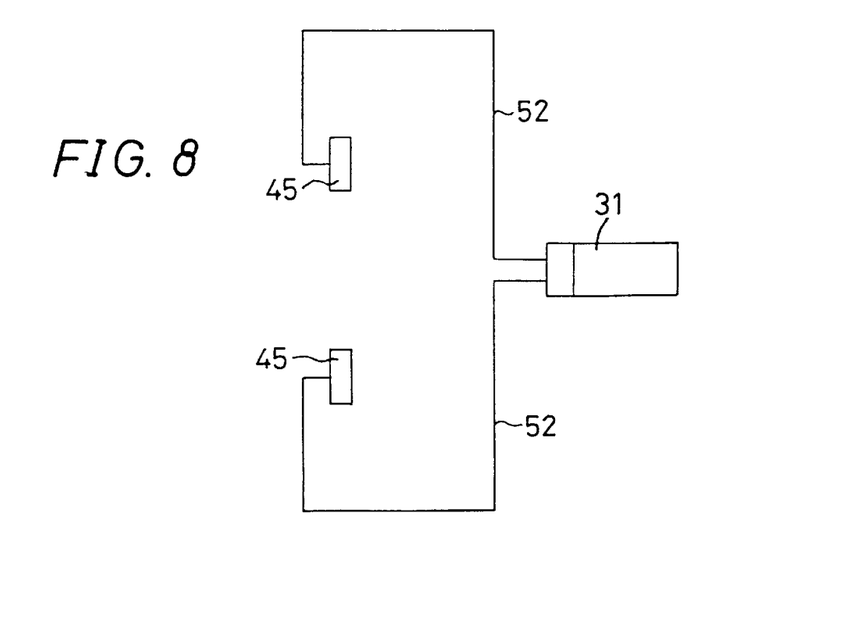
FIG. 8 is a block diagram showing a part of the control circuit of the airbag apparatus 1.

As described above, via the conductive wires 47, the processing circuit 37 is electrically connected to the acceleration sensor 43 for sensing acceleration in the direction nearly parallel to the traveling direction of the vehicle 2 and also connected to the acceleration sensor 44 for sensing acceleration in the direction nearly perpendicular and nearly horizontal to the traveling direction of the vehicle 2, the two sensors being installed under the hood 6. The acceleration in the direction nearly parallel to the traveling direction of the vehicle 2, sensed by the acceleration sensor 43 at all times, and the acceleration in the direction nearly perpendicular and nearly horizontal to the traveling direction of the vehicle 2, sensed by the acceleration sensor 44 at all times, are transmitted to the processing circuit 37 via the conductive wires 47. If the acceleration transmitted from the acceleration sensors 43 and 44 is a preset value at which the airbag 30 is required to be inflated or a higher value, the processing circuit 37 closes a switch 49 and/or a switch 50. When the switch 49 and/or the switch 50 are/is closed, electric current flows through the ignition apparatus 35 of the airbag inflator 31 via the conductive wires 36. The ignition agent 32 is ignited, gas is generated, and the gas is jetted into the airbag 30 as described above to inflate the airbag 30. Electric power is supplied from the battery mounted on the vehicle to the processing circuit 37 and the acceleration sensors 43 and 44 at all times.

Figure 14:
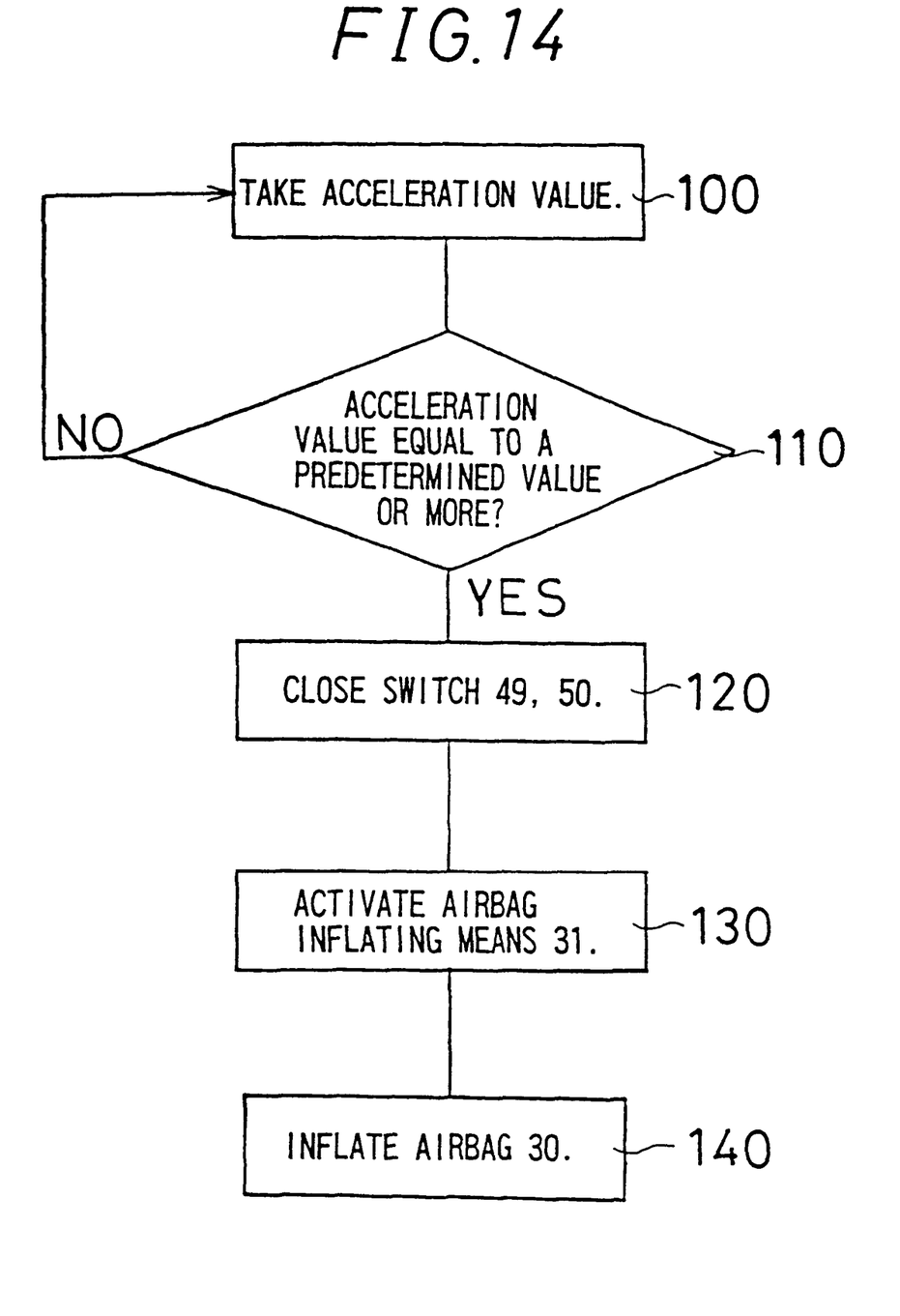
FIG. 14 is a flowchart illustrating steps from the sensing of acceleration to inflation of the airbag 30.

At step 100, the processing circuit 37 takes acceleration values transmitted from the acceleration sensors 43 and 44 at all times. At step 110, a judgment is made to determine whether the acceleration values transmitted from the acceleration sensors 43 and 44 are equal to a preset value at which the airbag 30 is required to be inflated or more. If the values are equal to the preset value or more, electric signals for closing the switch 49 and/or the switch 50 are sent to the switch 49 and the switch 50. At step 120, the switch 49 and/or switch 50 are closed by the electric signals sent from the processing circuit 37. At step 130, by the closing of the switch 49 and/or switch 50, electric current flows through the ignition apparatus 35 of the airbag inflator 31 via the conductive wires 36, the spring members 45 and the conductive wires 52, and the ignition agent 32 is ignited to inflate the airbag 30 as described above (at step 140).

The conductive wires 36 are formed of three conductive wires 36a, 36b and 36c. One end of the conductive wire 36a is connected to the switch 49 and the switch 50, and the conductive wire 36a is provided along the surface and/or through the inside of the seat belt 17 via the securing member 18, and is formed continuously up to the seat belt retractor 19. One end of the conductive wire 36b is connected to the switch 49, and the conductive wire 36b is provided along the surface and/or through the inside of the seat belt 17 via the securing member 18 and is formed continuously up to the seat belt retractor 19. One end of the conductive wire 36c is connected to the switch 50. The conductive wire 36c is provided along the surface and/or through the inside of the seat belt 17 via the securing member 18, and is formed continuously up to the spring members 45 of the airbag 30 installed on the side of the occupant 42.

Figure 12:
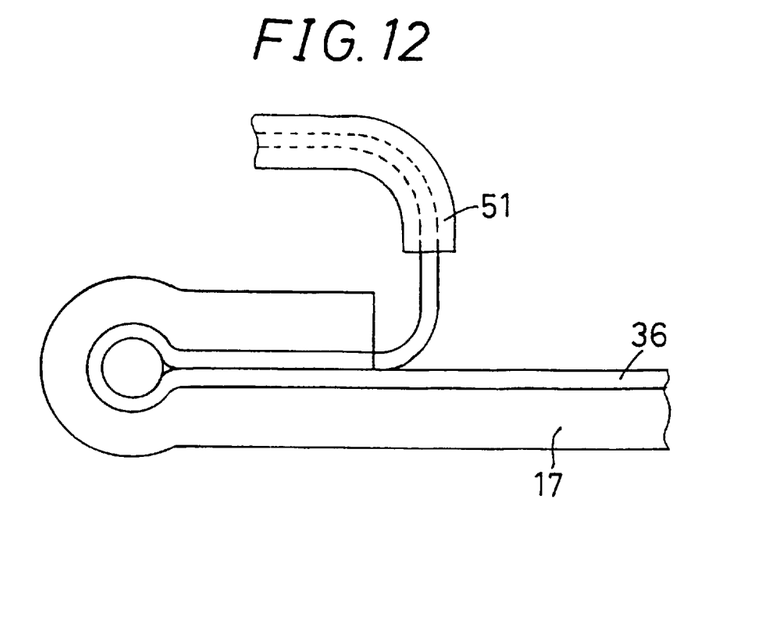
FIG. 12 is a side view showing a connecting part of the seat belt 17 and the conductive wires 36.
Figure 13:
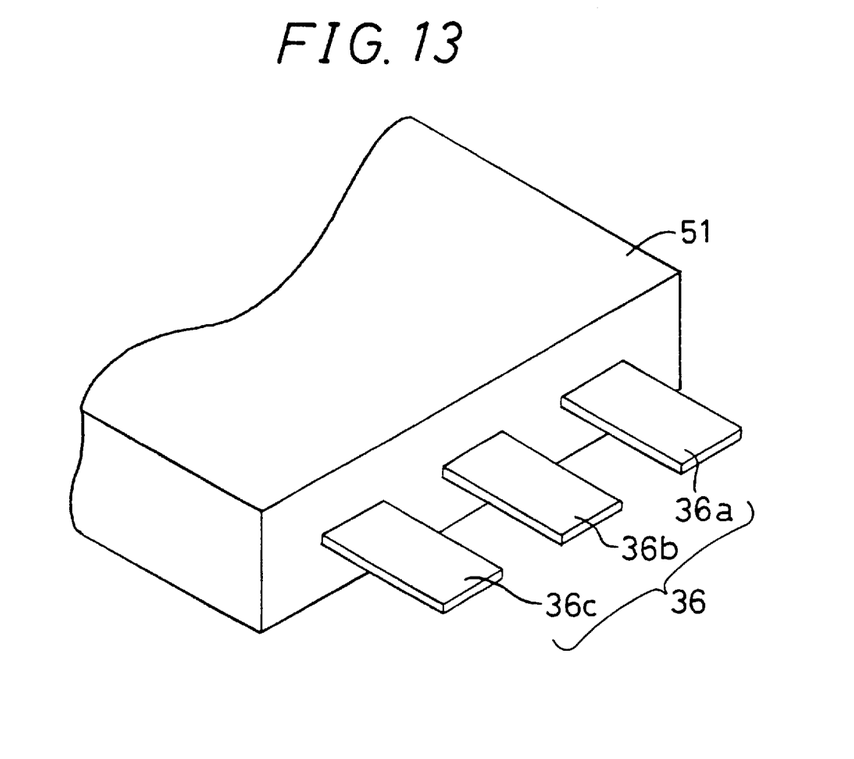
FIG. 13 is a schematic perspective view showing a connecting part 51 for connecting the conductive wires 36 to the seat belt 17.

The seat belt 17 is connected to the connecting part 51 of the conductive wires 36 in the vicinity of the securing member 18. By the connection between the connecting part 51 and the seat belt 17, when the processing circuit 37 closes the switch 49 and/or the switch 50, a closed circuit is formed, electric current flows through the ignition apparatus 35, the ignition agent 32 is ignited, and the airbag 30 is inflated as described above.

Since the seat belt 17 is connected to the connecting part 51 of the conductive wires 36 in the vicinity of the securing member 18, only the seat belt 17 and/or the airbag 30 may be replaced when the seat belt 17 and/or the airbag 30 are required to be replaced. Therefore, replacement can be carried out easily and effectively. It is thus not necessary to replace more than necessary materials, components, furnishings, etc., thereby ensuring increased economy.

Furthermore, an airbag apparatus in accordance with another embodiment of the present invention is installed on a seat belt installed in a seat provided in automobiles, airplanes, buses, ships, trains and human-ridden amusement park facilities.

Figure 15:
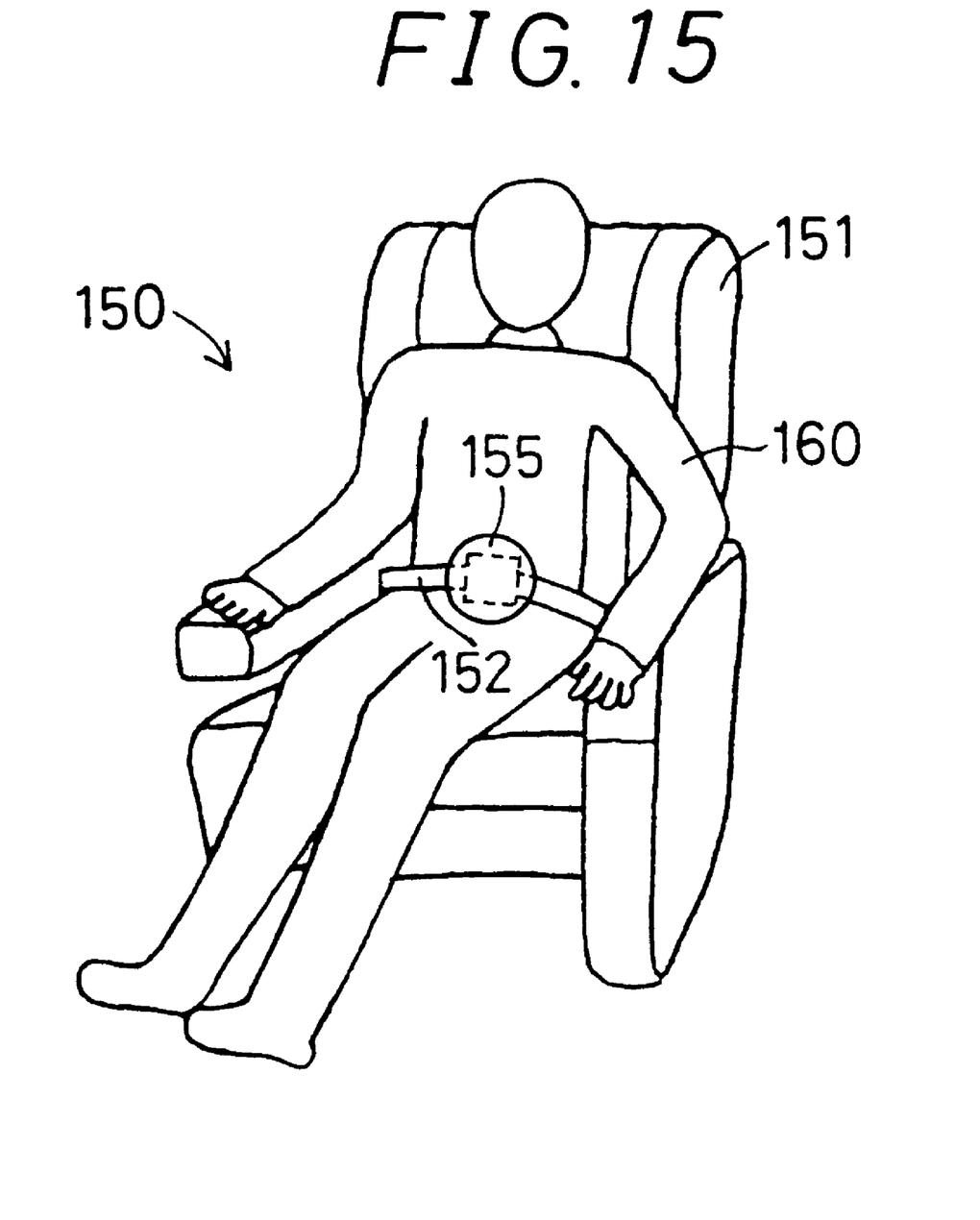
FIG. 15 is a schematic perspective view showing a condition wherein an occupant wears the seat belt of an airplane, to which an airbag apparatus 150 of another embodiment of the present invention is applied.

FIG. 15 is a schematic perspective view showing a condition wherein an occupant wears the seat belt of an airplane, to which an airbag apparatus 150 in accordance with the other embodiment of the present invention is applied. The basic configuration of the airbag apparatus 150 is similar to that of the airbag apparatus 1.

The airbag apparatus 150, having an airbag compartment 155 including an airbag that is capable of inflating when the airbag apparatus 150 receives large impact at the time of an airplane accident or senses very high acceleration not caused during ordinary flights because of an abrupt drop in the altitude of the airplane, a Dutch roll flight, etc., is installed on the seat belt 152 provided for the seat 151 of the airplane. At the time of an airplane accident or the like, the airbag apparatus 150 inflates the airbag forward of an occupant 160 to absorb the impact that might otherwise be directly applied to the occupant 160, thereby to reduce injury to the occupant 160.

In addition, when the airbag apparatus 150 in accordance with the present invention is applied to the seat belt provided for a seat in a ship, the airbag including gas therein also functions as a buoy. Therefore, even if an occupant is thrown into the sea at the time of a ship accident or the like, the airbag including gas therein can be used as a buoy.

Furthermore, even when the airbag apparatus in accordance with the present invention is applied to a seat or the like in a human-ridden amusement park facility, such as a roller coaster, injury to the occupant at the time of an accident can be reduced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An airbag apparatus for a vehicle, for protecting a vehicle occupant by instantaneously inflating an airbag during an accident, the airbag apparatus comprising:
    an airbag inflatable by being filled with gas;
    an airbag storage member that houses the airbag, when the airbag is in a non-inflated state prior to an accident, the airbag storage member having a top wall facing a forward direction relative to an occupant and a side wall facing sideward directions relative to the occupant,
    the airbag storage member being installed on a seat belt worn by the occupant;
    an airbag inflator that jets gas into the airbag;
    an acceleration sensor that detects acceleration; and
    wiring provided along the seat belt between the airbag inflator and the acceleration sensor,
    the airbag being inflated by the airbag inflator and released from the airbag storage member in the forward direction and the sideward directions relative to the occupant, upon detection of acceleration by the acceleration sensor,
    an interior surface of the side wall of the airbag storage member having plural notches formed therein, the interior surface of the side wall being torn upon inflation of the airbag so that the airbag is released in the sideward directions in addition to the forward direction.

2. The airbag apparatus of claim 1, wherein the airbag storage member is installed on the seat belt to be adjustable in a longitudinal direction of the seat belt.

3. The airbag apparatus of claim 1, wherein the airbag storage member is installed on a seat belt of a seat provided in an automobile, an airplane, a bus, a ship, a train or a human-ridden amusement park device.

4. The airbag apparatus of claim 1, wherein the wiring is provided in the seat belt.

5. The airbag apparatus of claim 1, wherein the wiring is provided on a surface of the seat belt.

6. The airbag apparatus of claim 1, wherein a portion of the wiring is provided on a surface of the seat belt and another portion of the wiring is provided in the seat belt.

7. An airbag apparatus for a vehicle, for protecting a vehicle occupant by instantaneously inflating an airbag during an accident, the airbag apparatus comprising:
    an airbag inflatable by being filled with gas;
    an airbag storage member that houses the airbag, when the airbag is in a non-inflated state prior to an accident, the airbag storage member having a top wall facing a forward direction relative to an occupant and a side wall facing sideward directions relative to the occupant,
    the airbag storage member being installed on a seat belt worn by the occupant;
    an airbag inflator that jets gas into the airbag;
    an acceleration sensor that detects acceleration; and
    wiring provided along the seat belt between the airbag inflator and the acceleration sensor,
    the airbag being inflated by the airbag inflator and released from the airbag storage member in the forward direction and the sideward directions relative to the occupant, upon detection of acceleration by the acceleration sensor,
    a direction of gas jetted from the airbag inflator being non-perpendicular to a surface of the seat belt,
    an interior surface of the side wall of the airbag storage member having plural notches formed therein, the interior surface of the side wall being torn upon inflation of the airbag so that the airbag is released in the sideward directions in addition to the forward direction.

8. The airbag apparatus of claim 7, wherein the airbag storage member is installed on the seat belt to be adjustable in a longitudinal direction of the seat belt.

9. The airbag apparatus of claim 7, wherein the airbag storage member is installed on a seat belt of a seat provided in an automobile, an airplane a bus, a ship, a train or a human-ridden amusement park device.

10. The airbag apparatus of claim 7, wherein the wiring is provided in the seat belt.

11. The airbag apparatus of claim 7, wherein the wiring is provided on a surface of the seat belt.

12. The airbag apparatus of claim 7, wherein a portion of the wiring is provided on a surface of the seat belt and another portion of the wiring is provided in the seat belt.

13. An airbag apparatus for a vehicle, for protecting a vehicle occupant by instantaneously inflating airbags during an accident, the airbag apparatus being installed on a seat belt worn by the occupant, the airbag apparatus comprising:

inflatable airbags respectively housed in airbag storage members mounted on the seat belt, the airbag storage members each having a top wall facing a forward direction relative to the occupant and a side wall facing sideward directions relative to the occupant, airbag inflators that respectively inflate the inflatable airbags when high acceleration occurs during an accident, the airbag inflators each including a gas generator that jets gas into the respective inflatable airbag;

at least one acceleration sensor that detects the high acceleration that occurs during an accident;

a processing circuit that processes signals from the at least one acceleration sensor; and wiring provided along the seat belt between the airbag inflators and the processing circuit, the processing circuit activates the gas generators by providing a signal to the airbag inflators via the wiring, upon detection of the high acceleration by the at least one acceleration sensor, the inflatable airbags being made of synthetic fiber and being formed so as to be respectively accommodated in a folded non-inflated condition in the airbag storage members which are made of a synthetic resin, the inflatable airbags being instantaneously inflated to be released from the airbag storage members in the forward direction and the sideward directions relative to the occupant, an interior surface of the side wall of each of the airbag storage members having plural notches formed therein, the interior surface of the side wall being torn upon inflation of the inflatable airbag housed within the respective airbag storage member, so that the inflatable airbag housed within the respective airbag storage member is released in the sideward directions in addition to the forward direction.

14. The airbag apparatus of claim 13, wherein the airbag storage members are installed on the seat belt to be adjustable in a longitudinal direction of the seat belt.

15. The airbag apparatus of claim 13, wherein the airbag storage members are installed on a seat belt of a seat provided in an automobile, an airplane, a bus, a ship, a train or a human-ridden amusement park device.

16. The airbag apparatus of claim 13, wherein the wiring is provided in the seat belt.

17. The airbag apparatus of claim 13, wherein the wiring is provided on a surface of the seat belt.

18. The airbag apparatus of claim 13, wherein a portion of the wiring is provided on a surface of the seat belt and another portion of the wiring is provided in the seat belt.

* * * * *